April 23, 1963 L. E. ELFES 3,086,620
BRAKE ASSEMBLY
Filed Jan. 3, 1961 2 Sheets-Sheet 1

INVENTOR.
BY LEE E. ELFES
Wolfe Hubbard Voit & Osann

April 23, 1963

L. E. ELFES 3,086,620

BRAKE ASSEMBLY

Filed Jan. 3, 1961

INVENTOR.

BY *Lee E. Elfes*

*Wolfe Hubbard Voit & Osann*

United States Patent Office 3,086,620
Patented Apr. 23, 1963

3,086,620
BRAKE ASSEMBLY
Lee E. Elfes, Birmingham, Mich., assignor to Massey-Ferguson Inc., Detroit, Mich., a corporation of Maryland
Filed Jan. 3, 1961, Ser. No. 80,246
8 Claims. (Cl. 188—75)

The present invention relates to an improvement in brakes and more particularly to the compact, high torque brakes used in agricultural tractors.

In an effort to meet the need for a compact brake having high torque capacity, the external shoe type cone brake was developed, for example, as shown in British Patent No. 783,490 dated September 25, 1957. While these brakes have been found to be useful for many applications, their use in tractors has been accompanied by certain disadvantages. These disadvantages arise principally where the brake is installed some distance away from the axle bearings. Thus when a substantial braking force is applied large unbalance forces are set up accompanied by excessive shaft deflection and resulting in noise and vibration. The amount of braking torque available in a cone-type brake under such circumstances is severely limited.

Accordingly it is an object of the invention to provide an improved brake assembly for use in tractors and the like which, for a given cone size, is capable of developing substantially higher braking torques than conventional brakes of the same general type. It is a correlative object to provide a brake assembly in which the necessary braking capacity may be squeezed into a smaller space than has been possible in the past.

It is another object to provide a cone-type brake capable of being used on a shaft between widely separated supporting bearings for developing high braking torques but which is free of any tendency to chatter and which operates without noise and vibration. It is, moreover, an object of the invention to provide a brake assembly which limits the deflection of the shaft which can occur under severe braking conditions, which minimizes side thrust and other unbalanced forces, and which consequently tends to protect and extend the life of the associated bearings and to reduce the likelihood of metal fatigue. Notably, it is an object of the invention to provide a brake assembly in which the shaft deflection is not eliminated but on the contrary is uniquely employed, within certain prescribed limits, to bring about the beneficial result.

It is a further object to provide an improved brake for a tractor or the like which is extremely simple and inexpensive and which may be produced by relatively simple modifications of existng brake structure. It is entirely conceivable that the invention may be incorporated with minor modification, in cone-type brakes already in the field to increase their effectiveness.

It is still another object to provide an improved tractor brake which is easy to operate and which achieves up to twice the braking torque of prior cone-type brakes of equal size but with no increase in the pressure requirements at the operating pedal. Stated in other terms the same braking effect may be achieved with a substantial reduction in the force at the pedal. This increase in braking efficiency makes power brake servos unnecessary in most instances. And since twice the braking area is available, the brake as a whole has a wear rate, at the shoes, which is only about half of that of the conventional brakes.

In one of its aspects it is an object to provide a cone-type brake having a fixed shoe and a movable shoe with provision at the fixed shoe for equalizing the wear over the entire surface and for permitting easy installation without necessity for positioned adjustment.

Finally it is an object of the invention to provide a brake assembly possessing the above advantages and which is inexpensive to make and easy to maintain, with novel provision for inspection of the linings by the operator without the services of a mechanic or repair shop. Other objects and advantages of the invention will become apparent upon reading the attached detailed description and upon reference to the drawings in which.

While the invention will be described in connection with a preferred embodiment, it will be understood that I do not intend to limit the invention to that embodiment. On the contrary, I intend to cover the various modifications and equivalents included within the spirit and scope of the invention as defined by the appended claims.

Figure 1:
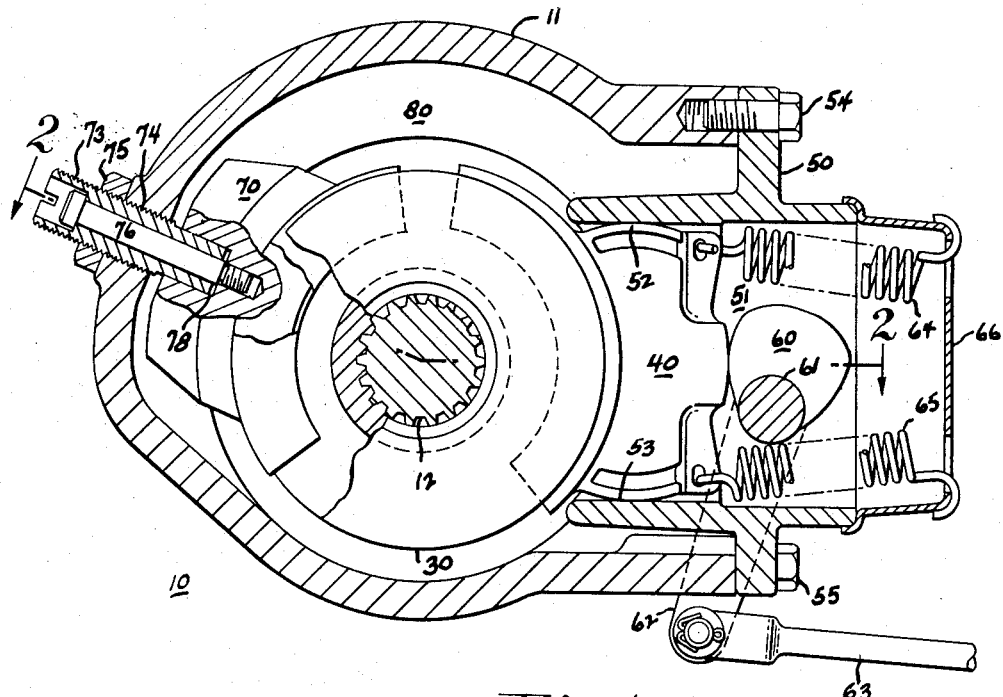
FIGURE 1 is a transverse sectional view of a tractor rear axle in which the novel brake assembly has been incorporated and taken along line 1—1 in FIG. 2.
Figure 2:
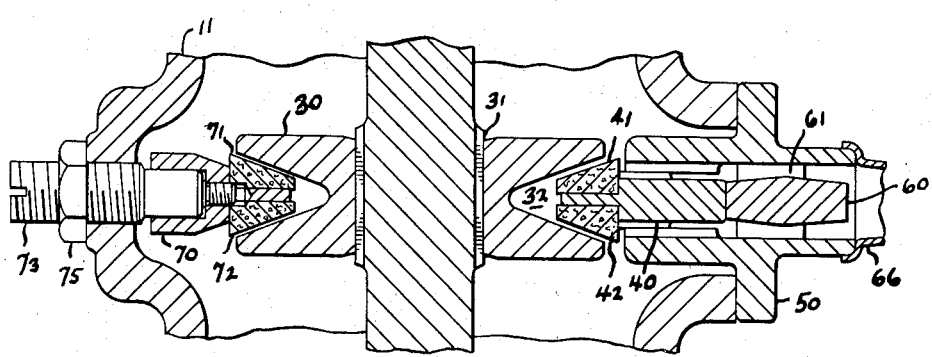
FIG. 2 is a fragmentary sectional view taken approximately along the intersecting planes represented by lines 2—2 in FIG. 1.

Turning now to the drawings there is shown in FIGS. 1 and 2 a novel brake assembly 10 mounted within the rear axle housing 11 of an agricultural tractor or the like. Extending axially through the housing 11 is a rear axle made up of two independently rotatable sections 12, 13 mounting wheels 14, 15 respectively (see FIG. 3). Section 12 of the rear axle is supported by bearings 16, 17 which are, as shown, rather widely spaced from one another. The brake assembly 10, associated with the axle section 12 and positioned between the bearings, will be discussed in detail. A second brake assembly 10a, substantially identical to the first, and having parts correspondingly numbered, is mounted on the axle section 13. It will be understood that the assemblies are simultaneously actuated by a foot pedal, power actuator or the like for the purpose of stopping the tractor. For simultaneous driving the two portions of the axle, the usual differential 20 is provided coupled by bevel gearing to a longitudinal drive shaft 21.

In carrying out the invention the axle section 12 mounts a brake disc 30 which is rotatably fixed to the shaft 12 by a spline connection 31. Formed in the periphery of the disc 30 is an annular V-shaped groove 32. For the purpose of frictionally engaging the walls of the groove 32 to apply braking torque, a movable brake shoe 40 is provided having faces 41, 42 which are angled to conform to the walls of the groove 32 and which extend arcuately about the periprery of the disc through an angle which may be on the order of 135°.

For the purpose of urging the shoe 40 radially inward toward the disc 30 while constraining the same against peripheral movement, the shoe 40 is mounted in a guide member 50 in the form of a cover plate having a central opening 51 of rectangular cross section in which the shoe is freely movable. To inhibit any tendency toward binding of the shoe within the member 50, the upper and lower edges of the shoe are preferably rounded as indicated at 52, 53 respectively. The guide member 50 is detachably secured to the rear axle housing 11 by suitable bolts 54, 55, enabling the shoe and associated linkage to be removed as a unit.

In order to forcibly urge the brake shoe 40 into its braking position an operating linkage is provided including a cam 60 mounted upon a shaft 61 and provided with an operating arm 62 to which is connected a pull rod 63 connected to the brake pedal or power actuator. The shoe 40 is retracted in constant engagement with the cam 60 by means of a pair of springs 64, 65 which are connected to the upper and lower ends of the shoe 40 and which have their outer ends hooked to a cap 66.

In accordance with the present invention the disc 30 is engaged by a relatively fixed brake shoe secured to the housing 11 and arranged to engage the brake disc on the side opposite the movable brake shoe 40, the fixed brake shoe being adjustably positioned to provide a small amount of running clearance with respect to the brake disc, and with the shaft bearings being so spaced that when pressure is applied to the movable shoe sufficient shaft deflection occurs so as to bring the fixed shoe into engagement with the disc. Thus, as shown in FIGS. 1 and 2, a relatively fixed shoe 70 is provided having frictional surfaces 71, 72 thereon of substantially the same arcuate extent as the first shoe 40 and located substantially opposite the first shoe. For supporting the shoe 70 in the housing and for adjusting the normal running clearance with respect to the disc, a combined adjusting and mounting screw 73 is provided which is screwed into the housing as indicated at 74 and which is fixed in adjusted position by means of a lock nut 75.

For the purpose of maintaining the shoe 70 captive at the inner end of the adjusting screw while permitting limited swiveling movement of the shoe relative to the housing, the inner end of the adjusting screw is in the form of a smoothly cylindrical post fitted into a corresponding cylindrical opening in the shoe, and a central retaining screw 76 is mounted inside of the adjusting screw 73 with its tip threadedly bottomed in the shoe 70. The length of the retaining screw 76 is preferably such as to define a very slight amount of lost motion as indicated at 78. Providing slight play at this point, which may be on the order of only a few thousandths of an inch, results in a limited floating action so that wear is more evenly distributed over the available surface of the shoe. Also it will be understood that the amount of clearance or lost motion affects the threshold of operation of the fixed brake shoe. Thus when the amount of clearance or play is at a minimum, the second brake shoe will be engaged to exert braking effect with only minor shaft deflection and the two shoes are brought into action about the same time. If sequential action is desired, with the second brake shoe coming into action only after rather substantial forces are developed at the first shoe, then the amount of the clearance at 78, or alternatively, the amount of running clearance, may be increased as desired. In any event it will be apparent that the brake shoe 70, while capable of limited movement, is bodily fixed with respect to the housing 11, with the adjusting screw being made as heavy as may be necessary to withstand large torsional forces.

With regard to the lining used in the present brake, i.e., material which forms the faces 41, 42 and 71, 72, it will be understood that this may be the conventional molded lining material of the type well known in the brake art.

Figure 3:
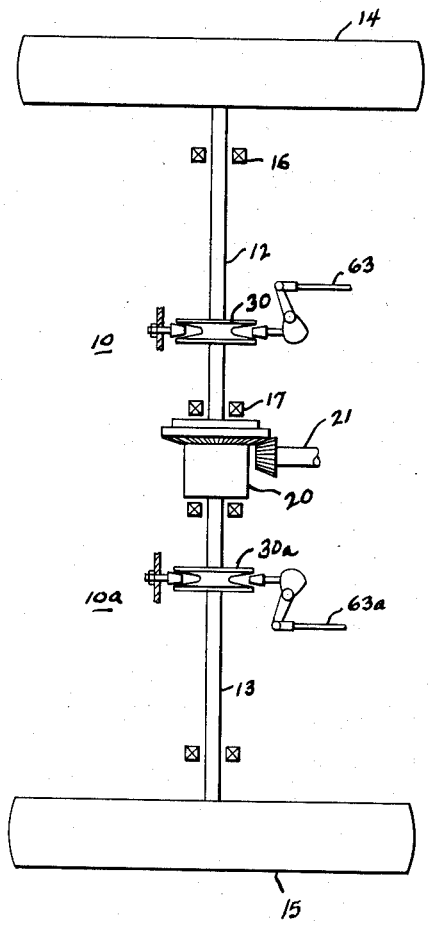
FIG. 3 is a simplified schematic view of a vehicle drive axle arrangement showing the brake assembly in its disengaged position.
Figure 4:
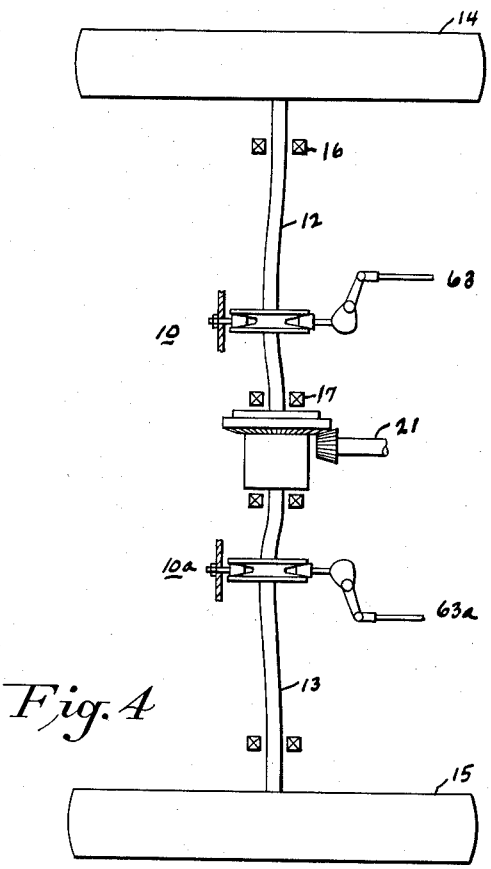
FIG. 4 is a view similar to FIG. 3 but showing the brake engaged and with the shaft deflections purposely exaggerated in order to bring out the principle of operation.

While the features and modes of operation of the improved brake will be apparent to one skilled in the art in view of the above description, nevertheless it will be helpful to consider a typical braking sequence relative to FIGS. 3 and 4 of the drawings. Under normal running conditions the movable brake shoe 40 is retracted by the springs 64, 54 and the cam 60 occupies "low" phase position as shown. The vehicle axle sections 12, 13 are straight and undeflected so that a small amount of running clearance (see FIG. 2) exists between the shoe 70 and the brake disc 30.

When it is desired to apply the brake, the pull rods 63, 63a connected to the brake pedal or other suitable actuator are tensioned, rocking the cam 60 which cams the shoe 40 into engagement with the brake disc. If the braking force is applied gradually to the pull rod, a certain amount of braking action will take place between the shoe 40 and the disc without the stationary shoe 70 being brought into action. However, upon continued increase in the applied braking force, the section 12 of the vehicle axle will undergo a bowing deflection as shown in FIG. 4 thereby bringing the brake disc 30 into engagement with the fixed shoe 70. Thus, as soon as the normal running clearance plus any lost motion at the end of the adjusting screw is taken up, the brake shoe 70 will begin to exert a substantial braking force. The amount of shaft deflection required in a practical case to achieve full braking action at the fixed shoe 70 may vary depending upon the setting of the adjusting screw 73. The force required depends upon the stiffness of the axle or shaft and the spacing of the bearings. In a practical case such deflection may be on the order of one-eighth inch. While such a deflection may be considered rather large considering the cross section of the shaft, nevertheless it is to be noted that this is only a fraction of the deflection which might otherwise occur, absent the fixed brake shoe. As a matter of fact employing a brake of the present type but without the applicant's improvement, jamming on of the brakes may produce shaft deflections of $\frac{3}{8}''$ to $\frac{1}{2}''$. Such deflections are objectionable because of the possibility of straining or fatiguing the axle and since they are accompanied by large unbalanced forces at the axle bearings.

The present brake is particularly advantageous since it takes care of the two extreme conditions. At the one extreme, where only a light application of the brake is necessary, substantially all of the braking may be done by the shoe 40 and with little or no accompanying deflection of the axle. This provides a sensitive braking "touch." At the other extreme, where full and immediate braking effect is required, jamming on of the brakes produces immediate shaft deflection within the limited range defined by the fixed brake shoe, so that the total braking area of both of the shoes 40, 70 is fully available and both shoes are active to an equal degree. In spite of the large braking forces which are possible with the present arrangement it will be noted that the forces applied to the shaft are substantially symmetrical and the unbalanced forces at the bearings 16, 17 are well within the limits of safety and good design. Only about half of the operating force is required as compared to brakes not utilizing the present improvement.

It is one of the features of the present arrangement that self-centering takes place at both of the shoes and in the brake disc itself so that each unit of area works at the same efficiency. Thus it will be noted that the shoe 40 may rock because of the curved support at surfaces 52, 53. Also, there is sufficient play so that the shoe 40 may move from side to side or skew slightly as may be necessary to accommodate it to the disc.

Moreover, the disc 30, having a splined connection with the shaft section, is free to move endwise a small amount as may be required to balance the forces on the two braking surfaces. In addition, the fixed shoe 70 is capable of swiveling about the axis of the adjusting screw so that it is free to aline itself precisely with respect to the disc. Finally, it will be understood that there may be slight looseness or play at the joint between the adjusting screw and the shoe 70 to provide still greater freedom of action insuring equal distribution of braking forces over the available area.

Because of the fact that the brake disc is gripped from both sides by the brake shoes, there is not only a balancing of forces as described above but also a substantial reduction or even elimination of noise or chattering previously experienced with brakes of the same general type. It is believed that the reason for this is that the shaft is no longer free to vibrate but is, on the contrary, effectively damped against lateral movement in any lateral direction, with the result that braking takes place smoothly and progressively under all conditions.

A further feature of the present construction is that inspection and maintenance requires but a few minutes and may be taken care of by the owner of the tractor without necessity for going into the shop. Thus, to inspect the condition of the brakes the screws 54, 55 which hold the guide member 50 in place are unscrewed so that the entire assembly may be removed as as unit simply by withdrawing it from the housing 11. In order to inspect the fixed brake shoe 70, the adjusting screw 73 and retaining screw 76 are unscrewed from the shoe 70 whereupon the shoe may be slid around, through a clearance space 80 formed in the housing (FIG. 1), into the same position as the shoe 40 for retraction through the same opening in the housing 11. Reassembly is equally easy, the above operations being simply reversed. Because of the fact that the amount of braking area is doubled, wear is substantially reduced so that inspection and replacement are required only infrequently.

While the invention has particular utility in a tractor it will be understood that it may be usefully employed wherever braking of a drive shaft is desired and hence the more general term drive shaft has been used in the claims.

I claim as my invention:

1. A brake assembly for a tractor or the like comprising, in combination, a drive shaft having spaced bearings supported in fixed location so that the shaft extends longitudinally therein, a brake disc mounted on the drive shaft intermediate the bearings, a movable brake shoe at one side of the disc and having means for forcing the same into radial engagement with the disc, a fixed brake shoe at the other side of said disc substantially opposite said movable brake shoe, said fixed brake shoe having a small amount of running clearance with respect to said brake disc and said bearings being widely spaced so that the disc engages the fixed brake shoe incident to the lateral deflection of the shaft which occurs upon engagement by said movable brake shoe.

2. A brake assembly for a tractor or the like comprising, in combination, a drive shaft having spaced supporting bearings carried in fixed location so that the shaft extends longitudinally therein, a brake disc mounted on the drive shaft between the bearings, a movable brake shoe at one side of the disc and having means for forcing the same into radial engagement with the disc, means providing a floating mounting for said movable brake shoe allowing limited radial and rocking movement while constraining it against circumferential movement, a fixed brake shoe at the other side of said disc opposite said movable brake shoe offset from direct alignment therewith, said fixed brake shoe having a small amount of running clearance with respect to said brake disc and said bearings being substantially spaced from the disc so that the lateral deflection of the shaft which occurs upon engagement by said movable brake shoe is effective to align the disc with the fixed brake shoe in the course of moving said disc into braking engagement therewith while said movable brake shoe by rocking conforms to the disc in the braking position.

3. A brake assembly for a tractor or the like comprising, in combination, a housing, a drive shaft having spaced bearings supported in said housing so that the shaft extend longitudinally therein, a brake disc mounted on the drive shaft intermediate the bearings, a movable brake shoe supported in the housing at one side of the disc, means providing a floating mounting for said movable brake shoe allowing limited radial and rocking movement while constraining it against circumferential movement, means for forcing the brake shoe into radial engagement with the disc, a fixed brake shoe at the other side of said disc, means including a radially extending adjusting screw threaded in said housing for supporting the fixed brake shoe with a small amount of running clearance with respect to said brake disc and providing limited floating action of the fixed shoe, so that the disc moves and engages the fixed brake shoe incident to the lateral deflection of the shaft which occurs upon engagement by said movable brake shoe, both said shoes conforming to the disc in the braking position.

4. A brake assembly for a tractor or the like comprising, in combination, a housing, a drive shaft having spaced bearings supported in said housing so that the shaft extends longitudinally therein, a brake disc mounted on the drive shaft intermediate the bearings, a movable brake shoe supported in the housing at one side of the disc, means for forcing the same into radial engagement with the disc, a fixed brake shoe at the other side of said disc, means including a radially extending adjusting post secured to said housing for supporting the fixed brake shoe with a small amount of running clearance with respect to said brake disc while permitting slight relative movement with respect to the housing so that the disc is brought into equalized engagement with the fixed brake shoe incident to the lateral deflection of the shaft which occurs upon engagement by said movable brake shoe.

5. A brake assembly for a tractor or the like comprising, in combination, a housing, a drive shaft having spaced bearings supported in said housing so that the shaft extends longitudinally therein, a brake disc mounted on the drive shaft intermediate the bearings, a movable brake shoe at one side of the disc and having means for forcing the same into radial engagement with the disc, said housing having an access opening alined with said disc and a cover member for normally enclosing the same with the movable brake shoe being supported on the cover member, a fixed brake shoe at the other side of said disc substantially opposite said movable brake shoe, said fixed brake shoe being disengageably supported on the housing so as to have a small amount of running clearance with respect to said brake disc and so that the disc engages the fixed brake shoe incident to the lateral deflection of the drive shaft which occurs upon engagement by said movable brake shoe, said housing being so formed as to define an annular clearance space leading to said access opening adequate to permit passage of the fixed shoe upon disengagement thereof to said opening for inspection and replacement.

6. A rear axle brake assembly for an agricultural tractor or the like comprising, in combination, a drive axle journaled in spaced bearings, a brake disc rigidly mounted on said axle, a first brake shoe, means providing a floating mounting for said first brake shoe allowing limited radial rocking movement while constraining it against circumferential movement, a second brake shoe on the other side of said disc opposite said first brake shoe offset from direct alignment therewith, means for adjustably mounting said second brake shoe to provide running clearance between the latter and the disc in an amount which is so small as to be taken up by the deflection of said axle resulting from the forced engagement of said first brake shoe with said disc which is effective to align the disc with the fixed brake shoe in the course of moving said disc into braking engagement therewith while both said shoes conform to the disc in the braking position, so that braking torque is applied to the disc simultaneously by both of said shoes.

7. A brake assembly for a tractor or the like comprising, in combination, a housing, a drive shaft having spaced bearings supported in said housing so that the shaft extends longitudinally therein, a brake disc mounted intermediate the bearings on the drive shaft for rotation therewith by means affording limited axial motion on the shaft, said brake disc having a peripheral V-groove, a movable brake shoe supported in the housing at one side of the disc, means for forcing said movable brake shoe into radial engagement with the disc, a fixed brake shoe at the other side of said disc, each said brake shoe having a wedge shaped facing angled to mate with said V-groove, means secured to said housing for supporting the first brake shoe with a small amount of running clearance with respect to said brake disc so that the disc is brought into engagement with the fixed brake shoe incident to the lateral deflection of the shaft which occurs upon engagement by said movable brake shoe, said brake disc shifting endwise responsive to such engagement by said brake shoe to balance the forces on the brake shoe facings.

8. A brake assembly for a tractor or the like comprising, in combination, a drive shaft having spaced supporting bearings in fixed locations so that the shaft extends longitudinally therein, a brake disc mounted intermediate the bearings on the drive shaft by means affording axial motion on the shaft, a movable brake shoe at one side of the disc and having means for forcing the same into radial engagement with the disc, means providing a floating mounting for said brake shoe allowing limited radial and rocking movement while constraining it against circumferential movement, a fixed brake shoe at the other side of said disc offset from a direct alignment therewith, said brake disc having a peripheral V-groove, each said brake shoe having a wedge shaped facing angled to mate with said V-groove, means secured to said housing for supporting the fixed brake shoe with a small amount of running clearance with respect to said brake disc while affording slight floating action so that the disc moves and engages the fixed brake shoe incident to the lateral deflection of the shaft which occurs upon engagement by said movable brake shoe, both said shoes conforming to the disc in the braking position, said brake disc shifting endwise responsive to engagement by said brake shoes to balance the forces on the brake shoe facings.

References Cited in the file of this patent

UNITED STATES PATENTS

| | | |
|---|---|---|
| 294,416 | Wagner | Mar. 4, 1884 |
| 2,940,550 | Mathews | June 14, 1960 |

FOREIGN PATENTS

| | | |
|---|---|---|
| 2,934 | Great Britain | of 1879 |